United States Patent [19]
Young et al.

[11] Patent Number: 6,018,456
[45] Date of Patent: Jan. 25, 2000

[54] ENCLOSURE FOR REMOVABLE COMPUTER PERIPHERAL EQUIPMENT

[75] Inventors: James Patrick Young, Laguna Niguel; Donald Lee Clevenger, Huntington Beach, both of Calif.

[73] Assignee: CMD Technology, Inc., Irvine, Calif.

[21] Appl. No.: 08/656,032

[22] Filed: May 31, 1996

[51] Int. Cl.$^7$ ................................. G06F 1/16; H05K 7/14
[52] U.S. Cl. ............................................. 361/684; 361/727
[58] Field of Search ..................................... 361/683, 684, 361/685, 686, 724–727; 364/708.1; 312/223.1, 223.2; G06F 1/16

[56] References Cited

U.S. PATENT DOCUMENTS

| | | |
|---|---|---|
| 4,633,350 | 12/1986 | Hanson . |
| 4,754,397 | 6/1988 | Varaiya et al. . |
| 4,833,554 | 5/1989 | Dalziel et al. . |
| 4,853,830 | 8/1989 | Corfits et al. . |
| 4,858,070 | 8/1989 | Buron et al. . |
| 4,912,580 | 3/1990 | Hanson . |
| 5,041,924 | 8/1991 | Blackborow et al. . |
| 5,112,119 | 5/1992 | Cooke et al. ............................ 361/685 |
| 5,122,914 | 6/1992 | Hanson . |
| 5,124,886 | 6/1992 | Golobay ................................. 361/685 |
| 5,247,427 | 9/1993 | Driscoll et al. . |
| 5,612,854 | 3/1997 | Wiscombe et al. ....................... 361/727 |

FOREIGN PATENT DOCUMENTS

| | | |
|---|---|---|
| 0 464 658 | 1/1992 | European Pat. Off. . |
| 2153130A | 8/1985 | United Kingdom . |
| 2271446 | 4/1994 | United Kingdom .................. 361/683 |

OTHER PUBLICATIONS

IBM Technical Disclosure Bulletin, "Multipurpose System Package", vol. 38, No. 2, Feb. 1, 1995, pp. 347–350.

IBM Technical Disclosure Bulletin, "DASD Mounting System", vol. 36, No. 11, Nov. 1, 1993, pp. 491–492.

Bauman, B., "Removable Disks Can Help to Optimize Array Strategies", Computer Technology Review, vol. 12, No. 10, Aug. 1, 1992, pp. 37–38 and 40–41.

A copy of the International Search Report for counterpart PCT Application No. PCT/US97/08100.

Article entitled Removable Disk Subsystem, ECN, Feb. 1991.

IBM Technical Disclosure Bulletin, entitled "Customer Set–Up and Replaceable DASD Assemblies", vol. 27, No. 78, Dec. 1978.

*Primary Examiner*—Lynn D. Feild
*Attorney, Agent, or Firm*—Merchant, Gould, Smith, Edell, Welter & Schmidt

[57] ABSTRACT

An enclosure system for receiving a number of plug in computer peripheral devices, such as hard disk drives in a disk array, utilizes front and rear cages or enclosures that are separated by a vertical backplane having internal circuit interconnections and multi-pin docking connectors on each face. A front bezel provides access to the backplane through the front cage enclosure, so that trays containing the drives can be inserted and plugged into the connectors. The vertical spacing is arranged to be modifiable, so that different numbers of higher profile and lower profile devices can be used. Power supplies, battery back up units and a cooling fan device, all arranged in sub-modules insertable through the rear open face of the power supply enclosure, interconnect with connectors on the back face of the backplane, and cooling air is circulated throughout from front to rear, via apertures in the backplane.

18 Claims, 10 Drawing Sheets

ENCLOSURE FOR REMOVABLE COMPUTER PERIPHERAL EQUIPMENT

BACKGROUND OF THE INVENTION

This invention relates to enclosures, consoles and housings for receiving and operating computer peripherals and more particularly to such systems which allow computer peripherals, such as hard disk drives, to be readily interchanged and used in different combinations.

With the advent of disk arrays, in which a number of hard disk drives are used together with a data processing system so as to provide high storage capacity, manufacturers early adopted the approach of mounting a number of disk drives in a single enclosure. This became possible after hard disk drives and other peripherals became available that were compact, in successively smaller formats (8 inch, then 5¼ inch, then 3½ inch, for example) while achieving high capacity storage, now well into the gigabyte range. Host computers and disk drive controllers also were designed to operate different disk drives in interrelated fashion on data to be stored, such as by employing disk striping to distribute a data block among a number of disk drives. Data distribution was used to substantially increase data transfer rates, and also to facilitate error correction, using redundancy to improve reliability. These developments also led to the introduction of a number of variants which became referred to as RAID technology, which now encompasses tape drives as well as hard disk drives. Among the features adopted were the use of exchanges of spare drives for defective drives, and the mounting of disk drives and other peripherals in plug-in cassettes, canisters or trays of different configurations. These allowed the peripherals to be inserted into and retained in the enclosure and enabled completion of electrical power and data transfer connections. Also, the peripherals could then be removed, often in a "hot swapping" approach that precluded the need for shutdown.

There are now many different types of enclosures for removable computer peripheral devices, including particularly hard disk drives, in RAID and non-RAID arrays. In addition, a number of adapter systems are available that are employable with a standard computer port or receptacle (now typically 5¼ inches or 3½ inches) to enable a smaller sized peripheral within a cassette or canister to be removably inserted. These and other units incorporate local controllers, power supplies and interconnects for the different computer peripheral devices.

However, as the array systems and structures have become available in larger volume, system requirements have come into conflict with demands for greater versatility in use along with customer insistence on reduced cost. Current demands are for enclosures which can incorporate different sizes of disk drives, so as to accommodate different storage capacities or different device preferences. In 3½ inch drives, for example, higher capacity units are taller (e.g., 1⅝ inches) than lower capacity (e.g., 1 inch high) units, even though both fit within a port or bay designed for a 3½ inch drive. An enclosure should therefore preferably accommodate an integral number of whatever height drive is to be used, or even allow a mix to be employed. Another respect in which the enclosure should be adaptable relates to the different types of bus interconnections that may have to be made. The host I/O connection can be any of a number of different types, and the local bus peripheral bus interconnections can also be of one of many different types, such as SCSI, IDE, and PCI. There is also growing adoption of a connection approach known as SCA (Single Connector Attachment). It is therefore desirable to have available an arrangement in which only a backplane need be interchanged if different buses are to be used. The multiple pin mating connectors and cables used with different buses also should be readily changeable for different configurations. When configurations change, the user interface (display and controls) should likewise be changed to be compatible.

The system should also include, for low cost and reliability, a capability for using standard subsystems, such as power supplies, batteries and fans in the different configurations. Installation and removal of peripherals and subsystems should be easy to accomplish manually. Adequate cooling must be provided no matter what configuration of peripherals and subsystem is used. Also, the system, no matter which arrangement is adopted, should have a modern, aesthetically pleasing, appearance.

SUMMARY OF THE INVENTION

The objectives of the present invention are met by a novel modular construction which subdivides the total enclosure volume into a front disk cage and a rear power supply cage both open at the front and rear and separated along a vertical plane by a backplane element. The two cages and interposed backplane are encompassed within an open fronted cover joined to a base supporting the cages and the backplane. A front bezel on the assembly provides access to the interior of the disk cage, while support devices such as modular power supply assemblies, a backup battery and a fan assembly are removably insertable within the power supply cage from the open rear side.

With this arrangement, canisters in the form of trays containing individual computer peripherals, such as disk drives, are slidable along selectively configurable guide rails into the disk cage. Multi-pin docking connectors extending from the inserted end of the trays, and engaged by interior circuit cables within the trays to the disk drives themselves, mate with aligned complementary docking connectors on the backplane when fully inserted. The configuration may be such that the enclosure can receive six low-profile disk drives as one alternative, or four higher profile disk drives as another alternative. Power to the disk drives, and bus interconnects to the host I/O and drive bus, are made via the backplane and the docking connectors. A backplane can be used that enables accessing of peripherals separately as well as other backplanes that permit different array combinations.

Another advantageous feature is that the tray modules that contain the peripherals and the support modules that contain the power supply, battery and fan assemblies can be used in different enclosures and combinations. The approach encompasses such variants as a desktop assembly that holds different numbers of peripherals without a controller, or that can incorporate a removable RAID or non-RAID controller or include a fixedly mounted peripheral of a different format. Other variants include a tower enclosure for a larger number of peripherals, again with or without a controller, and a horizontal rack mount.

A feature of the invention is the incorporation, in combination with the bezel, of a uniquely versatile front end mechanical and electrical system. The bezel includes, along one side, a narrow vertical opening, and the disk cage enclosure incorporates a narrow backup wall, spaced behind the vertical opening, against which a strip PC board with LED or LCD indicators and control buttons may be removably placed. The strip PC boards are coupled to a connector on the backplane. A front strip with translucent cover windows and manual buttons is insertable in the vertical opening in the bezel or frame, to match the placement of the elements on the changeable strip PC board and the stack of computer peripherals. Thus when the configuration is changed to a different placement or number of peripherals, the user interface can conveniently be changed as well even though the larger components of the enclosure are unchanged.

The cages for receiving the modular units are designed so that guide rails for insertable modules can be placed at different height increments in a predetermined ratio. Also, the heights of the canisters are predetermined to be compatible with the same ratio. The ratio is chosen so that the periodicity of the two sequences repeats at selected placements, e.g., three lower profile units fill the same space as two higher profile units, with appropriate allowance for circuit connections and cooling air flow. Consequently, in one example the enclosure can receive six lower profile disk drives or four higher profile drives or different profile drives can even be used in a mixed manner. The guide rails are securely but removably attachable to the side walls of the cage at spaced apart, alternatively available apertures. By arranging the disk cage to be of lesser height than the cover, a separate top port or bay is made available, as for a backup tape drive or floppy drive. In one example, this may be any device designed to fit in a standard 5¼" drive bay. Activity lights and buttons used to prepare the buss for storage media removal can be disposed to maintain an aligned physical relationship to the various combinations of peripheral devices, using the front end circuit and display subsystem.

Separation of multi-pin connectors can require considerable force. To this end, a wall extension on the bezel, on each side, provides a vertical reference surface for cam ends extending from an off center pivot mounted handle at the front of each disk tray. When the handle is manually pivoted out to initiate the disk tray removal, substantial leverage is applied by action of the cam ends against the bezel surface to separate the multi-pin docking connectors, enabling the trays to be easily removed thereafter.

The disk trays are advantageously structured as generally U-shaped elements having a series of louvers in a wide lengthwise channel or depression along the under-side. The open-ended channel and the louvers both aid air circulation within the cage. In addition, the tray ends are configured to receive different configurations of front and rear cross pieces, which close off the ends, wholly or partially. The front end closures are typically molded plastic units containing a pivotable handle. At the rear of the tray, the closure element incorporates an outwardly extending docking connector for engagement into a mating connector on the backplane when the tray is inserted. Disk drive connector cables on the interior side of the rear cross piece couple the docking connector to the peripheral unit in the tray. The rear cross piece has side and bottom tabs which are securely and stably held in position in slots in the side and bottom walls of the tray. The rear cross piece is engaged in position simply by springing the sides of the tray apart to fit the cross piece in the slots. The tray is open topped, therefore of low cost and readily cooled, but it can receive different peripherals and different rear cross-piece and connector combinations.

With the modular and interchangeable stacking of units, provision is also included for adequate clearance and passage of cooling air across the peripherals and the support components. Air enters at the front side via apertures, moves along the tray freely because of the louvers and the open-ended channel, and then traverses the backplane through a plurality of pass-through bores. Air flow, from front to back, continues through and out the assembly via the cooling fan and fans and the power supply modules.

The 1½ inch tray also can contain secondary mounting holes to accommodate the use of single connector array (SCA) drives to mate directly to a special backplane in a quickly removable fashion.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
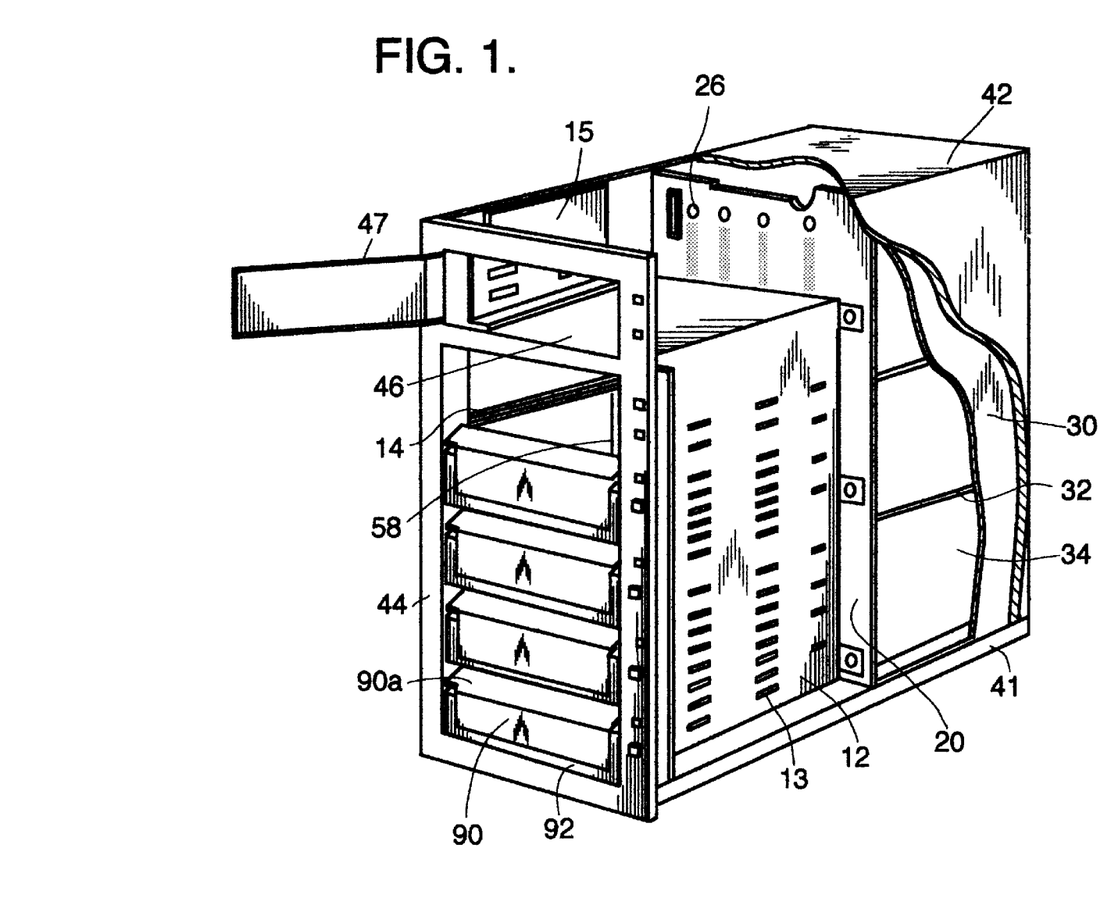
FIG. 1 is a perspective view, partially broken away, of an example of a system in accordance with the invention.
Figure 2:
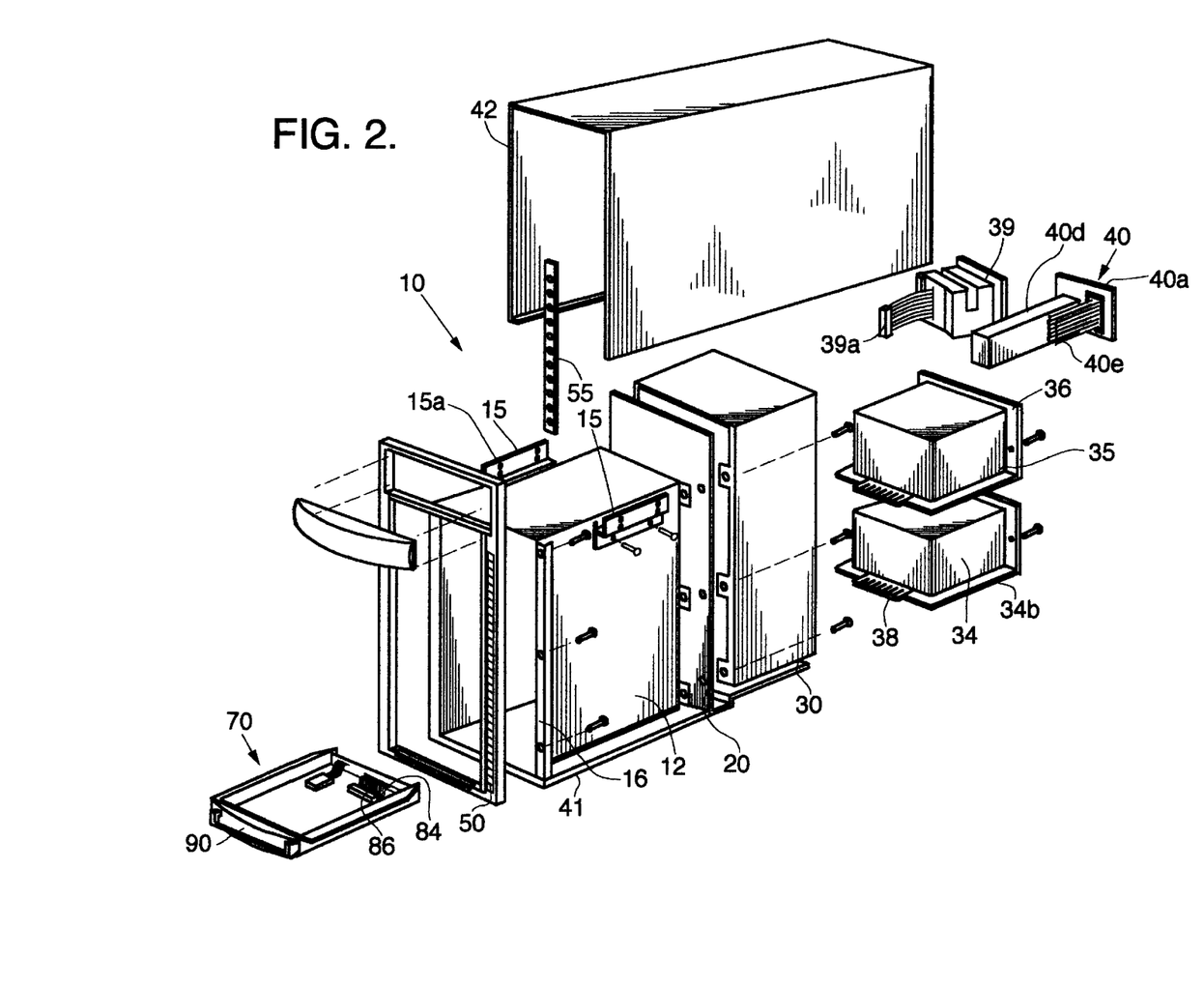
FIG. 2 is an exploded view of the arrangement of FIG. 1.
Figure 12:
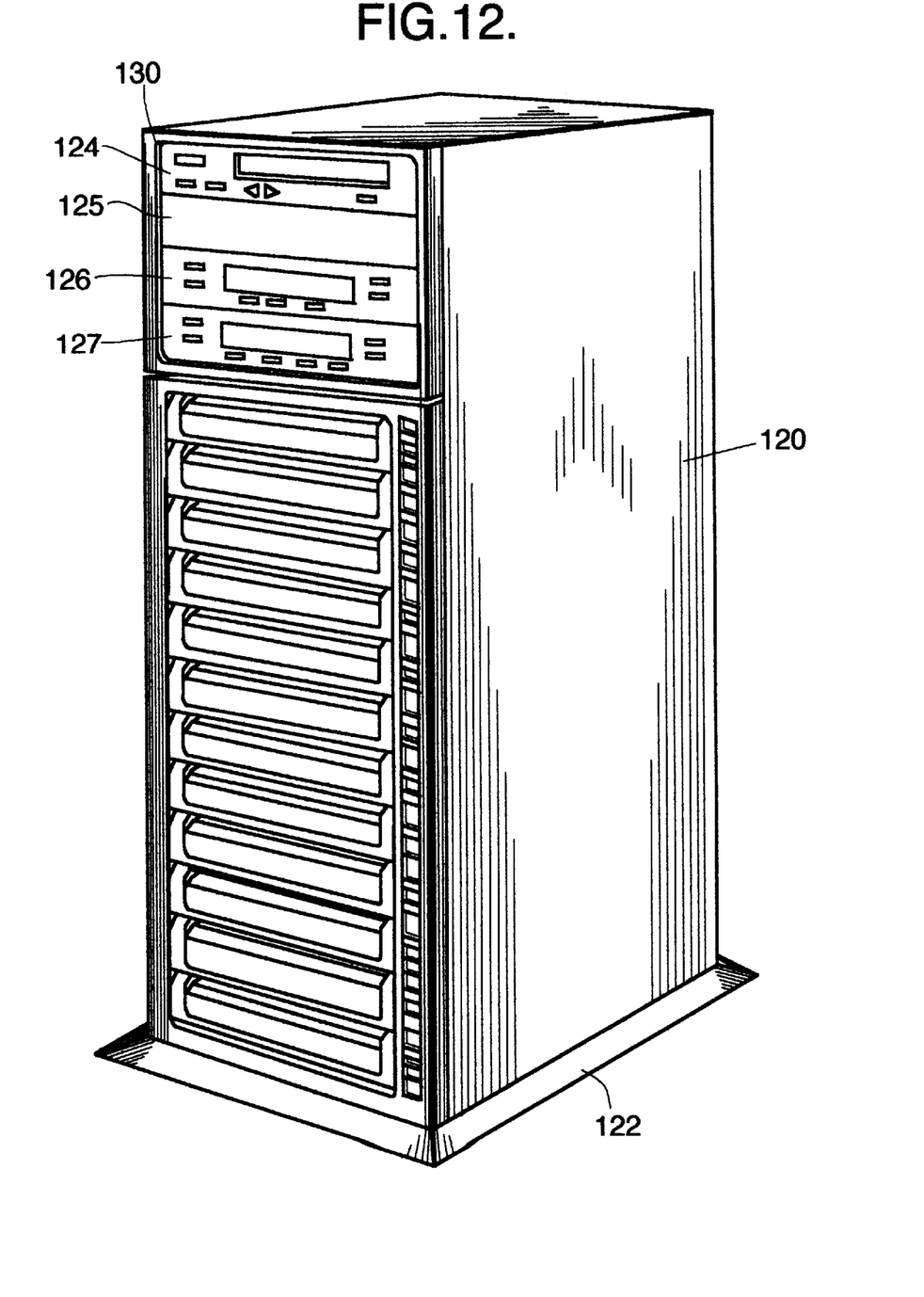
FIG. 12 is a simplified perspective view, partially broken away, of a tower enclosure configuration in accordance with the invention.
Figure 13:
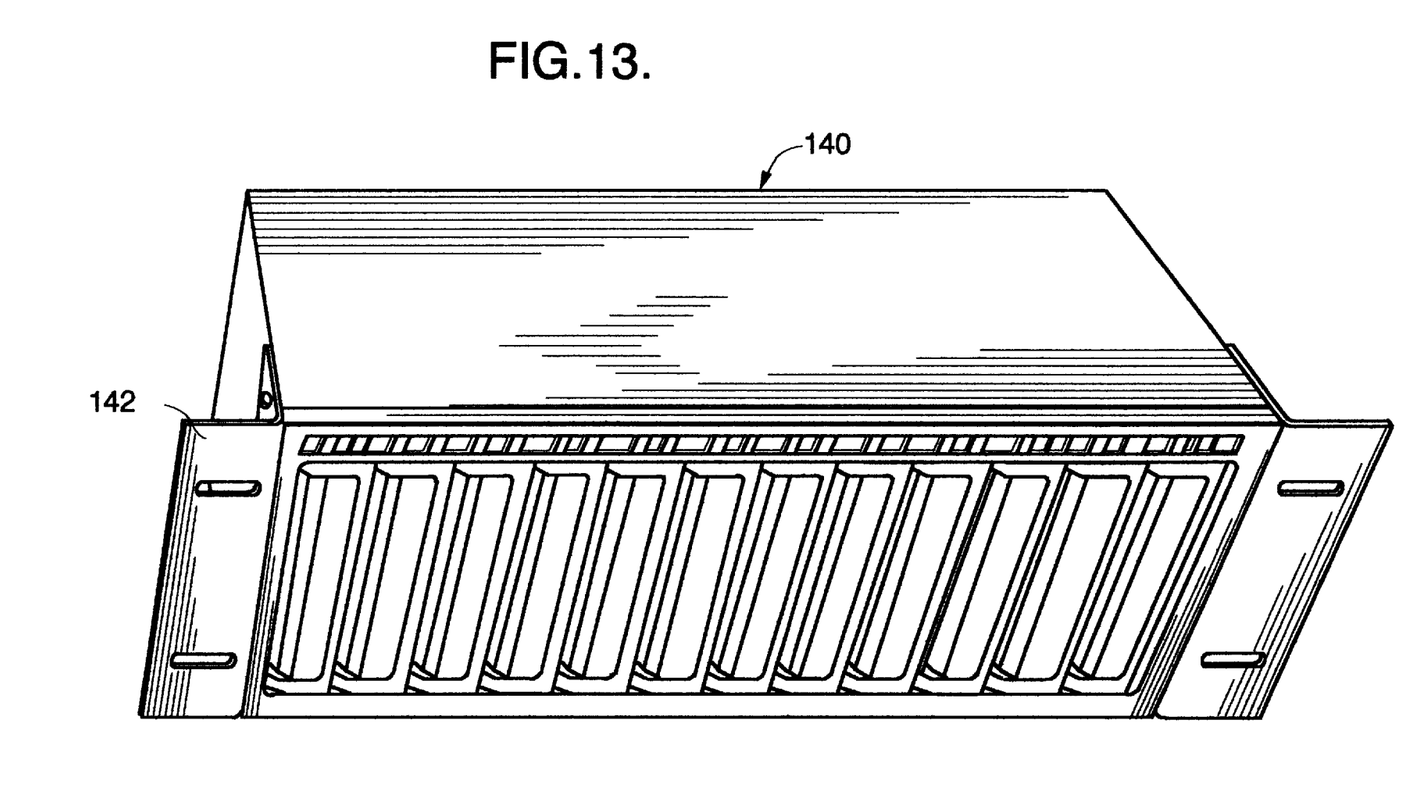
FIG. 13 is yet another example of a configuration in accordance with the invention, this being a rack mount version.

FIGS. 1 and 2 depict the overall features of a low-cost RAID enclosure, such as is used with personal computer systems, while FIGS. 12 and 13 depict a tower and rack mount enclosure, respectively. The low-cost RAID enclosure of FIGS. 1 and 2 is, as depicted herein, provides a housing for six, low profile (1 inch height) 3.5 inch disk drives, or four higher profile 1⅝ inch) 3.5 inch disk drives, together with a controller unit and an added peripheral.

A modular, adaptable enclosure 10 for a plurality of slide-in peripheral devices is shown in FIGS. 1–10, to which reference is now made. The peripheral devices, typically dimensioned to fit within a standard form factor, such as a 3½" format, may advantageously be hard disk drives. These are stacked in a disk array, and include a controller unit of like form factor. One or more of the disk drives may comprise a spare, and the enclosure also incorporates a port for a different peripheral, such as a tape back-up unit that can be fixedly installed or removable, if an adapter is used. As will be noted hereafter, other alternatives are available, giving the capability for significant variants.

Figure 3:
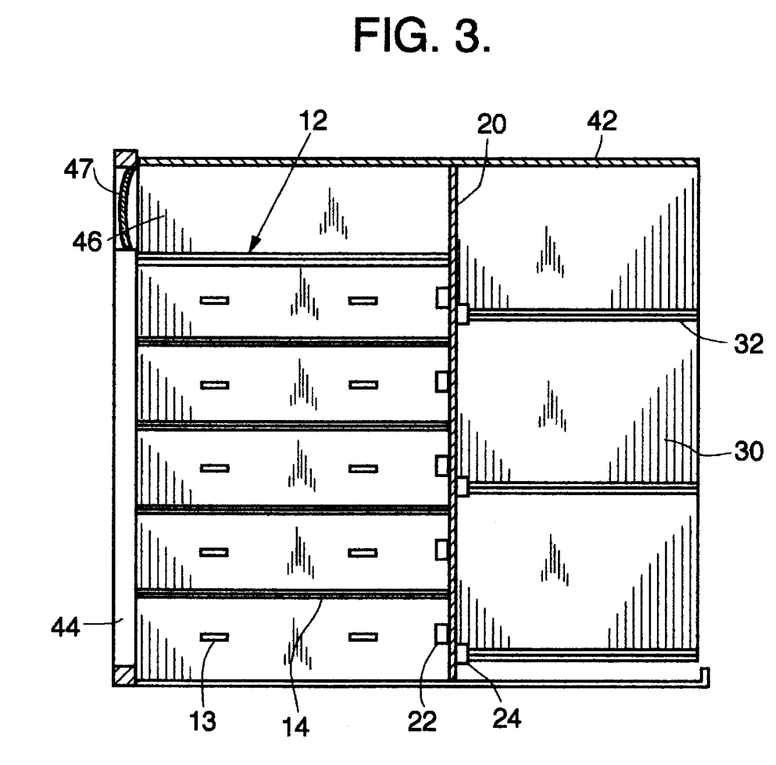
FIG. 3 is a side sectional view of the arrangement of FIGS. 1 and 2.
Figure 4:
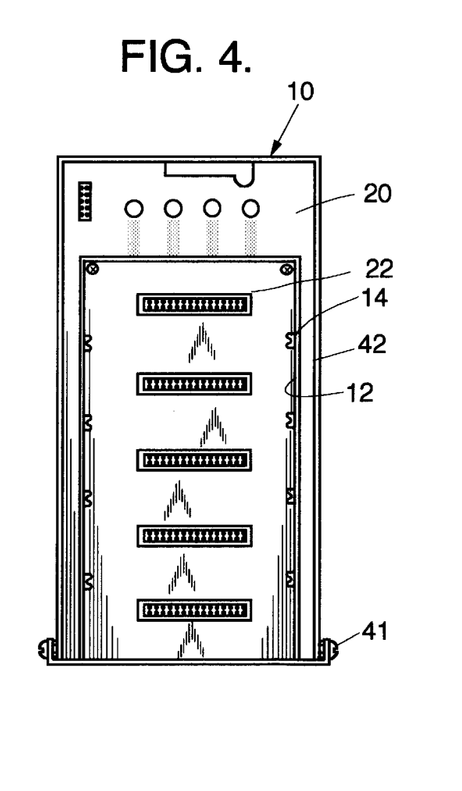
FIG. 4 is a front cross-sectional view of the arrangement of FIGS. 1 and 2.
Figure 5:
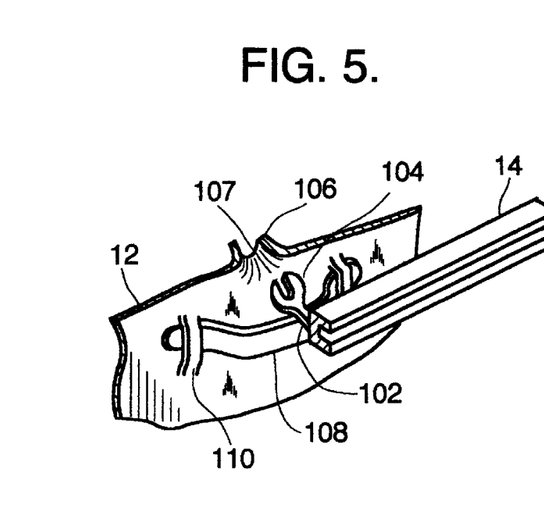
FIG. 5 is a top sectional view of a fragment of a guide rail feature used in the arrangement of FIG. 4.
Figure 6:
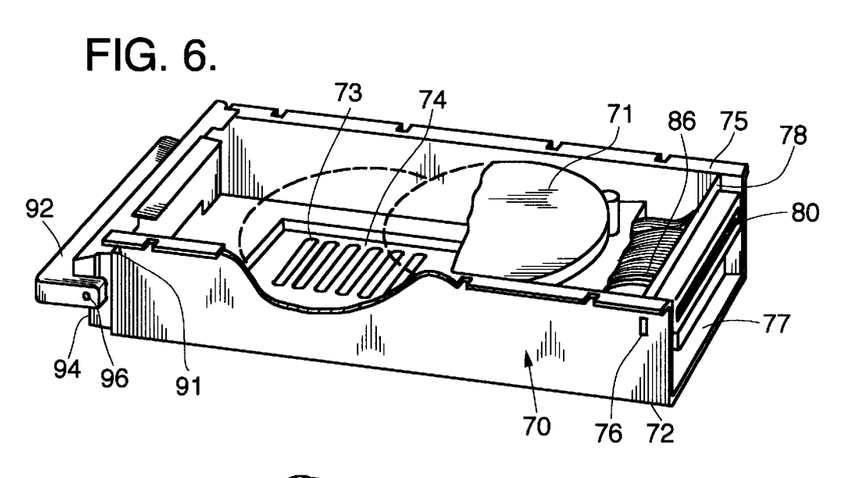
FIG. 6 is an enlarged perspective view, partially broken away, of a disk canister or tray useful in the arrangement of FIGS. 1 and 2, incorporating a disk drive therein.
Figure 7:
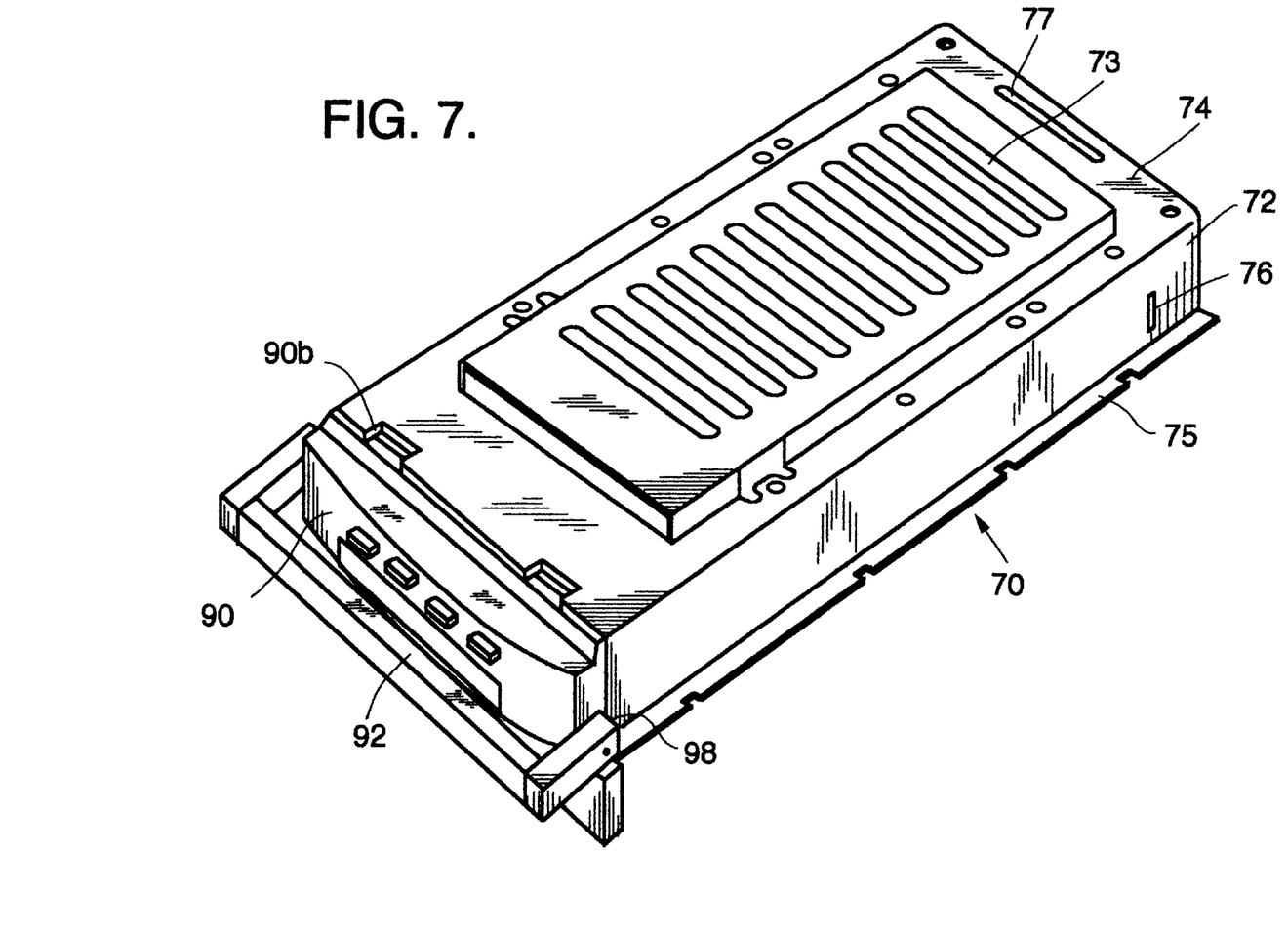
FIG. 7 is a bottom perspective view of the disk canister or tray of FIG. 6.
Figure 11:
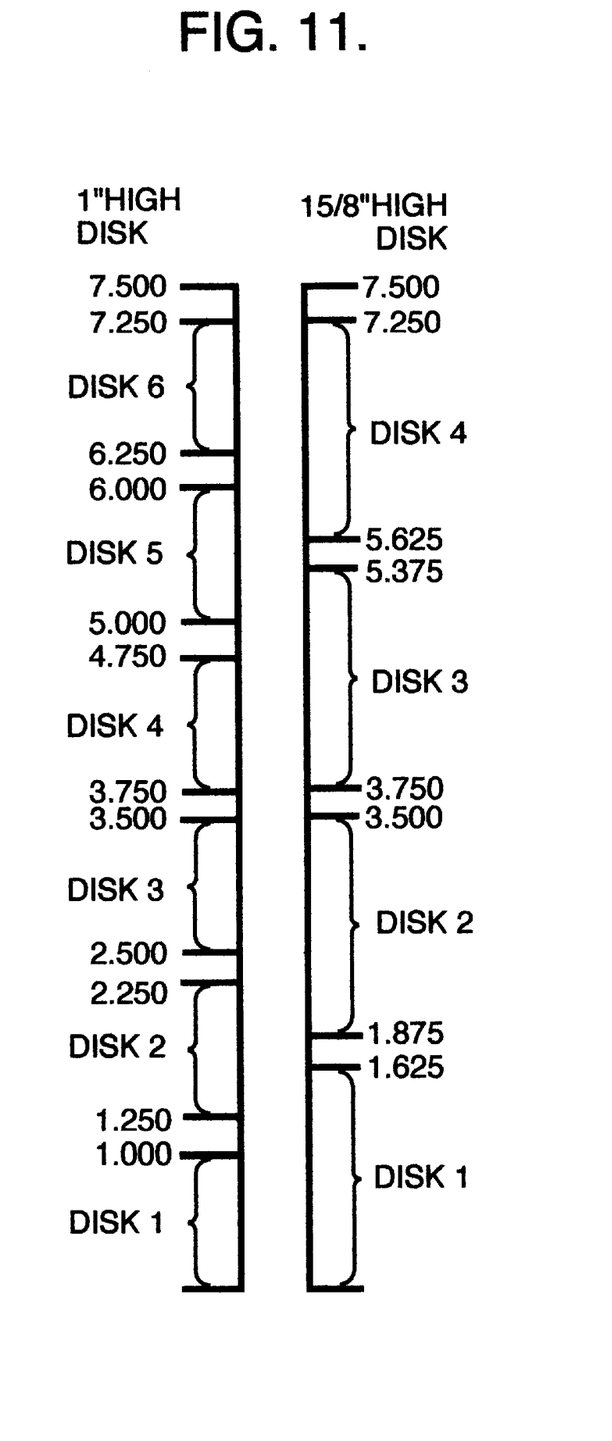
FIG. 11 is a simplified front view of a portion of the arrangement of FIGS. 1 and 2, showing the periodicity of alternative mountings for combinations of different height peripherals.

The front portion of the system is principally housed in a front disk cage 12 of rectangular outline, with an open front and rear, but a height which is lesser than the total height of the system by a space reserved for the top peripheral unit that is to be separately mounted. The front disk cage 12 is advantageously of low cost sheet metal construction, its height being determined by the number of peripheral devices to be stacked within it. Its width is less than the full lateral dimension of the enclosure so that side spaces are available for cooling and cabling. As seen in FIGS. 3, 4 and 11, the total height is selected to accommodate, with vertical spacings for air circulation between them, either four 1⅝" high 3½ inch hard disks or six lower profile, 1" high, hard disks. These are the substantially standardized sizes of disk drives of different capacities presenting being received from the disk drive industry. The available vertical spacings are defined by a plurality of positioning holes or slots 13 in the opposite vertical sides of the front disk cage 12, these holes enabling interior mountings of low friction guide rails 14. A unique guide rail design, discussed below in conjunction with FIG. 5, is combined with a series of lanced capturing features in a manner such that guide rails designed for use in significantly thicker material can be installed securely in a thin sheet metal cage, but still provide both removability and adequate support. In the example of FIGS. 1–4, the configuration selected receives five 1⅝" modules of 3½" wide form factor, and the uppermost port receives a 5¼" peripheral unit. This uppermost unit is mounted between vertical top side brackets 15 (FIGS. 1 and 2) incorporating slots 15a for matching to mounting holes in the extra peripheral device (not shown). The extra peripheral device (not shown) is fixedly mounted in conventional fashion in the uppermost port or bay, although it may be removable through use of a known adapter. At the front edge of the front disk cage 12, vertical side flanges 16 extend outwardly for mounting a front bezel, described below.

Immediately behind the front disk cage 12 is an upstanding backplane 20, here a double-sided, multi-layered printed circuit board (circuit interconnections are not shown in detail since well-known to those skilled in the art), for the disk array, the additional peripheral device, power supplies and other associated circuits and devices. Interconnections to the peripheral devices are made at docking connectors 22 on the front side of the backplane 20. For convenience and lowest cost, the backplane circuits can be designed to accommodate docking connectors 22 at alternative positions, in accordance with the different spacings that are available. Similarly, at the rear side of the backplane 20, other docking connectors 24 are aligned to receive complementary multi-pin terminals or connectors from support units, such as power supplies, reserve battery circuits, and a cooling fan module. The backplane also includes a large multiplicity of through bores 26 which allow passage of cooling air from the front of the enclosure 10 through the disk cage 12 and outwardly through the rear of the assembly.

Figure 8:
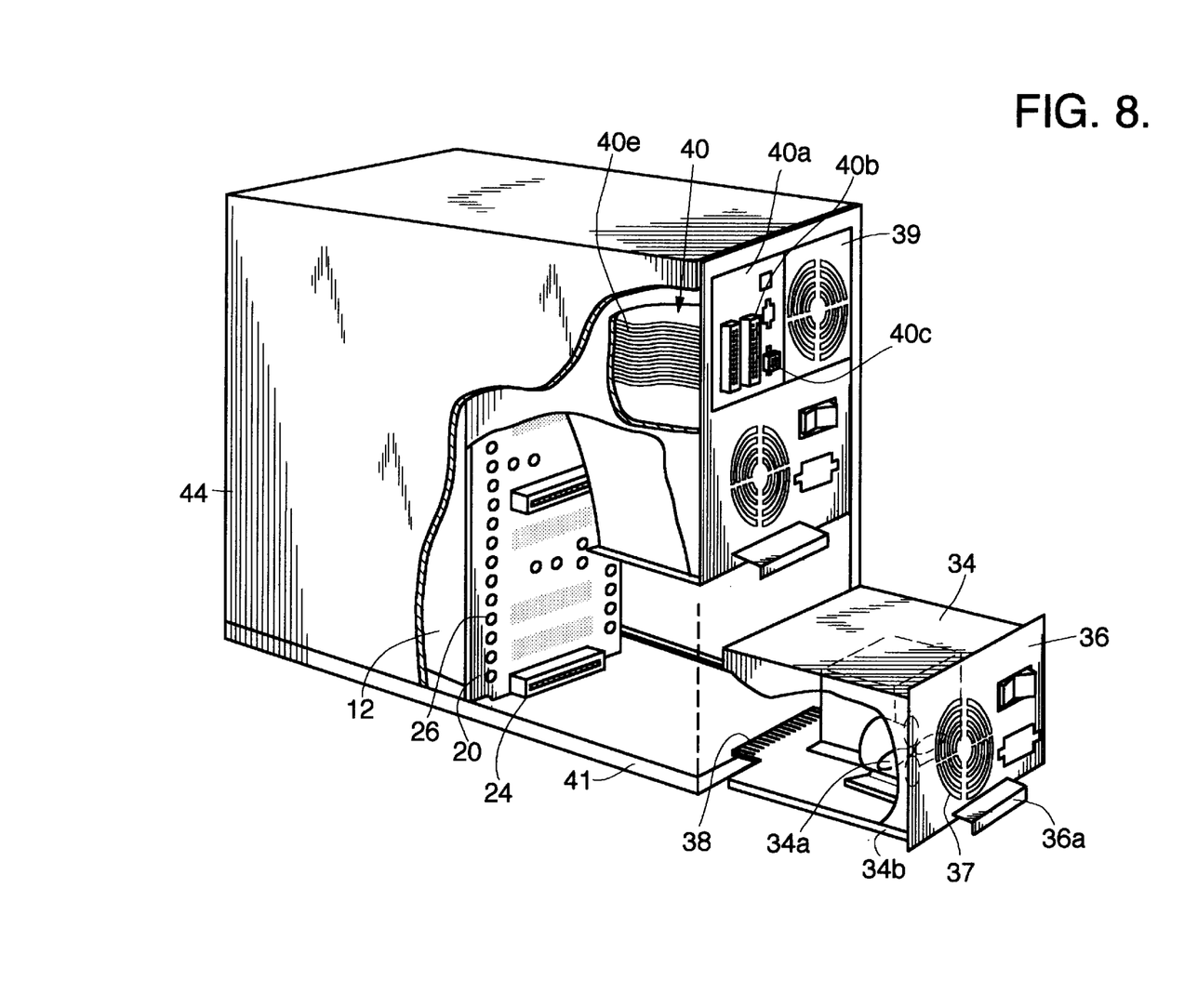
FIG. 8 is a perspective view, partially broken away, of the arrangement of FIGS. 1 and 2, illustrating the modular construction of power supply, backup battery and cooling fan subsystems at the rear of the enclosure.

Behind the backplane 20 is a rear power supply cage 30 (FIGS. 1, 3 and 8) which, like the front disk cage 12, is of rectangular shaped metal construction with open front and rear ends, but which is of full height. The power supply cage 20 also is of full lateral width relative to the front disk cage 12 and the backplane 20. Guide strips 32 are mounted in the opposite side walls of the power supply cage 30 at three different elevations, to receive different insertable modules. The two lower modules are power supply modules 34, 35 with internal fans 34a and include side edges 34b for mating in the guide strips 32, a back panel 36, and a handle 36a. The back panel 36 closes off the co-extensive part of the area of the rear end of the enclosure 10, except for a fan vent 37. Multi-pin terminals or connectors 38 on the forward edges of the modules 34, 35 are complementary to the docking connectors 24 on the facing surface of the backplane 20. The uppermost space in the power supply cage 30 receives a cooling fan module 39 in side-by-side relation to a battery compartment. As seen in FIGS. 2 and 8, the cooling fan module 39, which may have dual fans, fits into half the upper space and is electrically connected by a cable and plug 39a to the backplane. The battery compartment 40 is covered by a door 40a, which may be hinged, having external multi-pin connectors 40b and smaller connectors 40c accessible to outside lines. It also includes an internal battery 40d (and a trickle charger, not shown), for the battery, and flat multi-line cable 40e connected to the interior part of the multi-pin connectors 40b.

The remainder of the enclosure 10 is defined by an underlying base plate 41 with an upstanding peripheral lip, within which the disk cage 12, power supply 30 and backplane 20 are mounted, and by a full height U-shaped cover 42 with open front and rear areas.

The front face of the enclosure 10 (FIGS. 1 and 2) is closed off in part and completed by a bezel 44 of full height, the open interior of the bezel 44 allowing access to a stack of individual ports, defined by notches in the bezel and the positions of the guide rails 14, which establish the configuration desired for the plug-in peripherals. The bezel 44 also includes a top port 46 opening covered by a pivotable door 47, leading to an internal volume (in the 5¼" format in this example) for receiving the chosen added peripheral (not shown).

Figure 9:
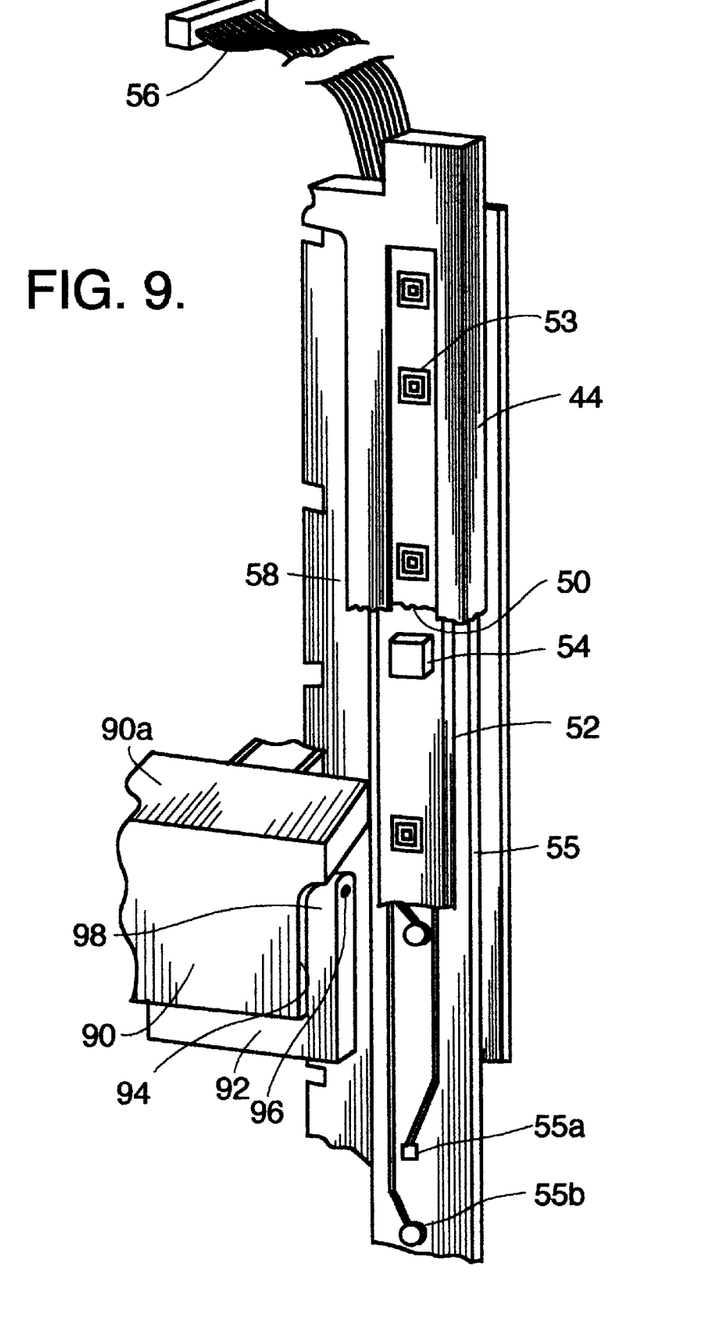
FIG. 9 is a fragmentary perspective view, partially broken away, showing details of an interchangeable display and control arrangement at the front bezel of the enclosure.

The bezel 44 shape defines an elongated vertical slot 50 (see FIGS. 2 and 9 particularly) along one side, behind which an indicator panel strip 52 having translucent indicator windows 53 and push buttons 54 aligned with each port position can be inserted. Behind the panel strip 52 is also removably mounted a PC board strip 55 with light emitting diodes (LEDs) 55a and small control buttons 55b. As seen in FIG. 9, a flat cable connection 56 from the PC board strip 55 extends through the space between the side wall of the disk cage 12 and the cover 42, for ultimate connection to the backplane 20. The panel strip 52 and PC board strip 55 can be interchanged for different elements if the stack of disk drives is changed to a different combination of size.

In accordance with another feature of the invention, the bezel 44 includes, along each side of the access ports, vertical back-up flanges 58 with notches 58a aligned with the guide rails 14. The spacings between the notches 58a permit the plug-in devices to be inserted freely into the guide rails 14, whatever the combination of sizes used.

Cabling connections (not shown) to a peripheral bus and a host bus are made, if desired, at the back of the enclosure 10 to the connectors 40b and 40c at the battery compartment.

Advantages of this modular enclosure system are numerous, starting with the flexibility afforded to system users, who can employ different combinations of peripherals having different profiles. Users can also incorporate controllers or not, with the stack of peripheral devices, and can add a peripheral of a different form factor, as well. Operative modules can be inserted and removed, simply by sliding into position to make electrical interconnection, which also secures the sub-module mechanically. With the disk cage and the power supply cage, on opposite sides of the backplane, the enclosure enables different mechanical and electrical arrangements, and different levels of module redundancy, to be used. If tower and rack arrangements are configured for different numbers and combinations of sub-modules in an array, then the same sub-modules can still be interchangeably employed.

The commonality of components and sub-assemblies, including trays, backplanes, cages, bezels, and connectors, reduces both production costs and inventory requirements. The enclosure and cage concept can nonetheless be adapted to any size and form factor requirement. Various peripheral devices can be installed in different stack positions, including those, such as floppy drives and CD-ROM drives, which use removable media.

As mentioned, the backplane can serve for a given combination of peripheral devices only, in which event the docking connectors are positioned in particular locations on both the front and back faces. With proper design of the backplane circuits and connectors, however, multi-pin docking connectors can be mounted at alternative locations, corresponding to the periodicity adopted for the chosen combination of units. In any event, backplanes, disk cage and power supply cage can readily be interchanged.

The arrangement also meets high reliability requirements since two power supplies are included, each of which can power all the devices. Furthermore, in the unlikely event of failure of both power supplies, the back-up battery prevents data loss and catastrophic failure for an adequate interval for maintenance.

Apart from the backplane and the docking connectors, the majority of the essential parts of the construction are readily fabricated for mass production using low cost sheet metal or molded plastic parts, arranged in such a manner as to provide a structure of adequate strength and rigidity. Furthermore, given the spaces between the peripheral devices, the flow paths through the backplane and the separate cooling fan systems, unrestricted air flow is established through the structure, from front to rear. In addition, these results are accomplished with a unit having a modern, pleasingly aesthetic appearance, with a uniform outline fronted by a shaped bezel and trays that can incorporate contrasting colors.

The versatility of the system is further enhanced by the usage of the changeable indicator panel strip 52 and adjacent PC board strip 55 alongside the stack of peripheral devices. When the configuration of peripheral devices is changed, as from four to six disk drives, a change in these strips, 52, 55 as depicted in FIG. 9, can be made to correspond. For example, the four 1⅝" height disk drives in FIGS. 1–4 each have an associated indicator light 53 (for on/off indications) and a separate push button 54. The uppermost access position in the disk cage 12 receives a plug-in array controller (not shown). The top access port may incorporate a 5¼" tape back-up unit (not shown). The controller (not shown) has its own selector buttons, a pair of indicator lights at the side and a front display screen for menus and messages, as seen on controllers 126 and 127 in the example of FIG. 12 below.

The PC strip board 55, connected by a cable 56 to the backplane 20, contains the active LED display elements 55*a* and depressible control buttons 55*b*, and is in circuit with the cable 56 by printed conductor lines. The superimposed indicator panel strip 52, which may include or the interest with the vertical backup flanges 58 and the aligned notches 58*a*, aligns with the PC strip board 55, with the visible windows 53 and push buttons 54 in alignment so that the operator knows the status of each device, and can turn them on and off. With a different device combination, the same bezel can be used, simply by changing the number and positions of the interior guide rails and the two strips 52, 55. If desired, the bezel 44 itself can have an integral panel strip 52 for the specific combination in the stack, but then bezels 44 have to be interchanged. Alternatively, the indicator panel strip 52 can be defined by a plurality of segments, each containing one or more each windows and control buttons.

The slide-in canister or tray for the peripheral device is itself a low cost, uniquely assembled, sheet metal tray 70 (see FIGS. 6 and 7) having a U-shaped body with open front and back ends for receiving the peripheral device, such as a hard disk drive 71. The tray body 72 is of a material, such as sheet metal, and thickness to provide adequate strength but to allow the sides of the body 72 to be sprung outwardly a short distance without permanent deformation. Lateral openings or louvers 73 to allow cooling air flow are provided along the bottom wall of the body 72, in an open-ended wide but narrow depth channel 74 or depression extending along a principal length of the bottom wall. The side walls terminate in outwardly extending lips 75 which slide within the guide rails in the disk cage. Adjacent the back end of the tray 70 are defined narrow vertical slots 76 in the side walls and a transverse slot 77 in the bottom wall in the same plane. A transverse printed circuit board 78 is fitted into the open ends of the tray, with stubs or tabs on the PC board 78 engaging into the side slots 76 and the bottom slot 77 when the sidewalls of the body 72 are sprung apart. The PC board 78 is thereafter firmly retained, in the slots 76, 77 until the side walls are sprung apart to release it and allow insertion of a different board. The PC board 78 mounts a docking connector 80 on its outward (distal) face, and a multi-pin connector 84 on its inside face. The power and data transfer pins on the connectors 80, 84 are joined by a line connection pattern on the PC board 84, as is well known. A cable 86 from the inside face connector 84 couples the lines to the appropriate power and data signal terminals on the hard disk drive 71.

The front end of the tray 70 is closed by a face block 90, which may be of molded plastic in an attractive, modern design and color. The face block 90 is secured to the front end of the tray 70 by snap tabs and one screw 91 and can be readily removable or not. A beveled upper surface 90*a* on the face block 90 and apertures 90*b* on the front edge of the bottom wall, allow ingress of air into the volume occupied by the tray 70.

Figure 10:
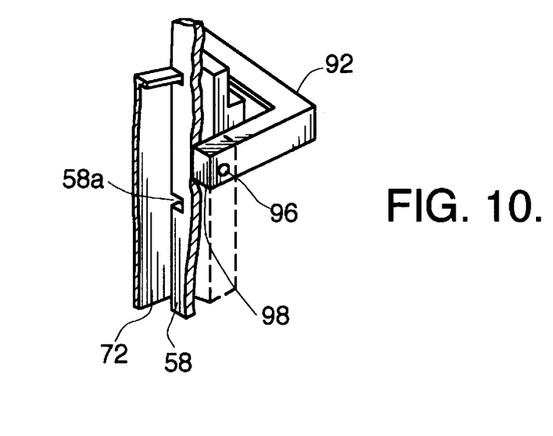
FIG. 10 is a fragmentary perspective view, partially broken away, showing further details of a force leveraging arrangement for disengaging a canister or tray.

A front handle 92 extends transversely across the front of the face block 90, the handle 92 having a rectangular U-shape that fits flush within an inset surface 94 in the face block 90 in normal use, as seen also in FIG. 10. The handle 92, however, pivots outwardly around pivot mounts 96 which are positioned off center relative to the mid-line of side bars on the handle 92. When the handle 92 is pulled out, end cam surfaces 98 on the handle 92 side bars extend beyond the face block 90 in the direction of the body of the tray 70.

When extended in this way, the end cam surfaces 98 on the handle 92 engage the back-up flanges 58 on each side of the bezel 44, providing a force leverage which helps to free the docking connector 80 at the inserted end of the tray 70 from the associated connector on the backplane 20. This enables easy one-hand operation in overcoming frictional resistance when it is at its highest, with the connectors fully engaged.

Other advantages of this configuration derive from the low cost construction, and the fact that the transverse PC board can be removed and interchanged. This feature is highly advantageous when it is desired or necessary to utilize a different disk drive interface or bus. Also, the tray provides adequate rigidity and protection for the hard disk drive 71, given that hard disk drives must be handled with reasonable care. Even though there are a number of removable transport canisters in use for plug-in hard disk drives, there is still a substantial risk of damage due to shock or vibration and better practice is to handle disk drives carefully. Also, the open top, louvered bottom and lengthwise channel along the bottom wall provide unrestricted cooling air flow through the tray 70, and about the hard disk drive 71.

The walls of the cages are relatively thin, which saves production as well as material costs. However, conventional means for attaching the guide rails 14 are not satisfactory. Molded projections from the guide rails 14 can be snapped into holes in a thick wall with adequate frictional retention under load, but not into a thin wall. Screw attachments are inconvenient and require an excessive increase in the rail 14 cross section. As shown in FIG. 5, however, these limitations are overcome by the use of molded projections on the wall engaging side of the guide rail that have a neck 102 and a bifurcated head portion 104 of larger diameter. The neck 102 is the same length and virtually the same diameter as a seating hole 106 in the sheet metal wall. The seating hole 106 has converging sidewalls 107 that lead into a central bore, and may be found by a punching or stamping process.

Thus, to install a guide rail 14 at a selected elevation in the cage, it need only be aligned so that the projections are opposite the seating holes 106, and inserted into position with the head 104 through the smaller end of the seating hole 106. The bifurcated head 104 retains the rail 14 in place, but allows manual removal. The weight of a tray on the guide rail 14 is supported by an underlying U-strap 108, the ends of which fit into lanced webs 110 formed in the cage wall.

The unit depicted in FIGS. 1–10 comprises what may be called a desktop unit, and is particularly advantageous where a number of disk drives are to be used together in a RAID array, with the controller internal to the enclosure 10 or optionally mounted elsewhere. As shown in FIG. 12, however, the identical conceptual approach can be utilized in a taller or more pronounced tower-type unit 120, having spaces for eight 1⅝" or twelve 1" height modules. The submodules and trays of the lower cost unit can still be used directly in this tower version, the cages, backplane and cover differ in the height dimension from the example of FIGS. 1–10. The unit 120 also has a base 122 for stability, and separates a superimposed stack of bays 124, 125, 126 and 127 within a separate bezel 130. This affords space for various combinations of units, such as a 5¼" tape drive 124, an available bay 126 and a pair of controllers 126 and 127. Other combinations can be used, as well as other stabilizers, such as pads or casters.

In some instances, referring now to FIG. 13, it is preferred to use a rack mount 140, with trays inserted with their long side vertical, across the standard 19 inch rack format. The rack mount unit 140 of FIG. 13 holds twelve low profile peripheral devices side-by-side along a horizontal plane. The disk cage enclosure and bezel can be interchangeable with the tower unit but the cover and side mounting flanges 142 are required to fit the standard rack dimensions.

It should be appreciated that sub-modules and trays can be interchanged between different units, since all three enclosures shown in the different figures can have a common depth of 14 inches. Whereas the desktop unit, the tower unit and the rack mount have different length dimensions (along the stack of slide-in units), the transverse and the front-to-back dimensions all can remain the same.

While a number of forms and modifications in accordance with the invention have been described, the invention encompasses all variations and expedients within the scope of the appended claims.

We claim:

1. A system enclosure for receiving a number of computer peripheral devices to be plugged into and removed from interconnecting circuits, comprising:

front and rear cage enclosures, each having a rectangular outline and open front and rear sides relative to an insertion axis the front cage enclosure including guide means positionable at different elevations on the sides thereof to accommodate combinations of peripheral devices of different heights;

a backplane circuit board having front and rear faces and being mounted vertically between the rear of the front enclosure and the front of the rear enclosure and including multi-pin docking circuit connectors on the front and rear faces;

a plurality of computer peripheral holding units, each insertable through the front of the front cage enclosure into engagement with connectors on the front face of the backplane; and a plurality of support modules insertable through the rear opening of the rear enclosure into engagement with the connectors on the rear face of the backplane.

2. The invention as set forth in claim 1 above, wherein the front enclosure is of lower height than the rear enclosure, and wherein the system enclosure further includes cover means about the front and rear cage enclosures, the cover means being of greater height than the front cage enclosure to define a port for a peripheral device at the top of the front cage enclosure.

3. The invention as set forth in claim 1 above, wherein the support modules comprise at least one power supply model, at least one battery back-up module, and a cooling fan module for the computer peripheral devices.

4. The invention as set forth in claim 3 above, wherein the power supply modules include internal fans and wherein the backplane includes means defining a plurality of apertures therein, such that cooling air flow passes from the front to the rear of the assembly through the backplane circuit board.

5. The invention as set forth in claim 1 above, wherein the holding units comprise trays having front end openings and at least one louvered wall for air circulation therethrough.

6. A system enclosure for receiving a number of computer peripheral devices to be plugged into and removed from interconnecting circuits, comprising:

front and rear cage enclosures, each having a rectangular outline and open front and rear sides relative to an insertion axis;

a backplane circuit board having front and rear faces and being mounted vertically between the rear of the front enclosure and the front of the rear enclosure and including multi-pin docking circuit connectors on the front and rear faces;

a plurality of computer peripheral holding units, each insertable through the front of the front cage enclosure into engagement with connectors on the front face of the backplane;

a plurality of support modules insertable through the rear opening of the rear enclosure into engagement with the connectors on the rear face of the backplane; and the system further including front cover means for providing access to the front enclosure, the front cover means including a vertical elongated and interchangeable control means adjacent to the access to the front enclosure, and wherein the front enclosure includes guide means positionable at different elevations within the enclosure to receive the holding units.

7. The invention as set forth in claim 1 above, wherein the system includes means in the front enclosure for receiving the holding units at different, periodic locations, the periodicity of the means for receiving being positioned to provide a selected integral ratio between peripheral devices of different height profiles.

8. The invention as set forth in claim 7 above, wherein the means for receiving comprise guide rails and the system further includes means in the front enclosure for supporting the guide rails against the weight of the holding units.

9. A system enclosure for receiving a number of computer peripheral devices to be plugged into and removed from interconnecting circuits, comprising:

front and rear cage enclosures, each having a rectangular outline and open front and rear sides relative to an insertion axis;

a backplane circuit board having front and rear faces and being mounted vertically between the rear of the front enclosure and the front of the rear enclosure and including multi-pin docking circuit connectors on the front and rear faces;

a plurality of computer peripheral holding units, each insertable through the front of the front cage enclosure into engagement with connectors on the front face of the backplane;

a plurality of support modules insertable through the rear opening of the rear enclosure into engagement with the connectors on the rear face of the backplane; and wherein the support modules comprise a pair of redundant power supply sub-modules, each having an internal fan and sufficient power supply capability to provide all needed power, the power supply modules including rear faces closing off the open rear side of the back enclosure when the sub-modules are plugged in, and the support modules also include a fan sub-module and a battery compartment including a backup battery and wherein the enclosure includes a panel closing the rear face of the battery compartment, and connectors on the panel.

10. A readily assembled, rearrangeable enclosure system for a plurality of computer peripheral devices, comprising:

a device cage enclosure having open front and rear sides and a rectangular configuration;

a power supply cage enclosure having a rectangular configuration and open front and rear sides;

a backplane circuit board located between the open rear side of the device cage enclosure and the open front side of the power supply cage enclosure and lying along a first plane transverse to the adjacent open faces of both rectangular enclosures, the backplane circuit board having front and rear faces;

a base plate supporting the device cage enclosure, the backplane circuit board and the power supply cage enclosure;

a cover fitting over the device cage enclosure, the backplane circuit board and the power supply cage enclosure, and coupled to the base plate the cover having open front and rear sides;

modular power supply means mounted in the power supply cage enclosure and including means for interconnecting to the rear face of the backplane on insertion;

a front bezel secured to the front side of the device cage enclosure and the cover and transverse thereto, said front bezel lying along a plane parallel to the first plane and including means defining a number of front access apertures for the devices to be inserted;

guide means mounted within the device cage enclosure for insertion of peripheral devices in alignment with the front access apertures; and a number of device holders, each for including a peripheral or a controller subsystem, and insertable into the device cage enclosure through the front access apertures in the front bezel and along the guide means, the holders including circuit means for interconnecting the peripheral device or controller subsystem therein to the front face of the backplane on insertion.

11. An enclosure as set forth in claim 10 above, wherein the device cage enclosure further incorporates means for retaining an elongated printed circuit display board extending along a front edge of the device cage enclosure, the display board being coupled to the backplane and the bezel incorporates means for accessing the printed circuit display board.

12. A readily assembled, rearrangeable enclosure system for a plurality of computer peripheral devices, comprising:

a device cage enclosure having open front and rear sides and a rectangular configuration;

a power supply cage enclosure having a rectangular configuration and open front and rear sides;

a backplane circuit board between the open rear side of the device cage enclosure and the open front side of the power supply cage enclosure, the backplane circuit board having front and rear faces;

a base plate supporting the device cage enclosure, the backplane and the power supply cage enclosure;

a cover fitting over the device cage enclosure, the backplane and the power supply cage enclosure, and coupled to the base plate;

modular power supply means mounted in the power supply cage enclosure and including means for interconnecting to the rear face of the backplane on insertion;

a front bezel secured to the front side of the device cage enclosure and the cover and including means defining front access apertures for the devices to be inserted;

guide means mounted within the device cage enclosure for insertion of peripheral devices in alignment with the front access apertures; and a number of device holders, each for including a peripheral or a controller subsystem, and insertable into the device cage enclosure along the guide means, the holders including circuit means for interconnecting the peripheral device or controller subsystem therein to the front face of the backplane on insertion;

wherein the means for guiding the device holders comprises longitudinal members selectively attached along the sides of the device cage enclosure at different height positions such as to provide a periodicity of three reduced height peripheral device units equal to that of two full-height units with spacings for air flow therebetween, and wherein a plurality of connectors are mountable on the front face of the backplane with corresponding selectable height periodicities for interconnections to the device holders when inserted into the enclosure.

13. An enclosure as set forth in claim 12 above, wherein the enclosure further includes means in the device cage enclosure for supporting the longitudinal members against the weight of the device holders, and wherein the device cage enclosure includes seating bores at selected optional positions in the device cage enclosure walls and the longitudinal members include projections for engaging in the seating bores.

14. A readily assembled, rearrangeable enclosure system for a plurality of computer peripheral devices, comprising:

a device cage enclosure having open front and rear sides and a rectangular configuration;

a power supply cage enclosure having a rectangular configuration and open front and rear sides;

a backplane circuit board between the open rear side of the device cage enclosure and the open front side of the power supply cage enclosure, the backplane circuit board having front and rear faces;

a base plate supporting the device cage enclosure, the backplane and the power supply cage enclosure;

a cover fitting over the device cage enclosure, the backplane and the power supply cage enclosure, and coupled to the base plate;

modular power supply means mounted in the power supply cage enclosure and including means for interconnecting to the rear face of the backplane on insertion;

a front bezel secured to the front side of the device cage enclosure and the cover and including means defining front access apertures for the devices to be inserted;

guide means mounted within the device cage enclosure for insertion of peripheral devices in alignment with the front access apertures; and a number of device holders, each for including a peripheral or a controller subsystem, and insertable into the device cage enclosure along the guide means, the holders including circuit means for interconnecting the peripheral device or controller subsystem therein to the front face of the backplane on insertion;

wherein the modular power supply means further includes a pair of power supply assemblies mounted in the power supply cage enclosure, and the system includes a fan assembly slidably mounted in the power supply cage enclosure adjacent the power supply assemblies, the power supply and fan assembly each having a closure surface covering a different part of the rear opening of the power supply cage enclosure, and the system further includes a backup battery in the power supply cage enclosure, and door means at the rear opening, the door means including accessible connectors on the outer face thereof.

15. An enclosure system as set forth in claim 14 above wherein the power supply assemblies include internal fans and the backplane includes means defining a plurality of through apertures to permit cooling flow through both the device cage enclosure and the power cage enclosure from front to rear.

16. An enclosure system as set forth in claim 10 above, wherein the device cage enclosure has a height less than the cover defining an upper port for a peripheral unit, the bezel including a door for accessing the upper port.

17. In an enclosure for receiving a series of removable computer peripheral devices, each in a separate slide-in canister, an arrangement for enabling different height canisters to be accommodated in different combinations the arrangement comprising:

an unpartitioned enclosure having parallel side walls spaced apart to receive the canisters in transverse relation to the side walls, the enclosure including support means in and along the side walls for detachably receiving side guides for the canisters, said support means being spaced vertically at selected intervals representing chosen canister heights and defining at least two different vertical spacing patterns having a fixed periodicity ratio between them that is not an even multiple;

side guides detachably mounted in said support means for receiving the canisters at incremental positions corresponding to the spacings needed for the heights of the different canisters chosen to be inserted; and connector means mounted in the enclosure at incremental positions corresponding to the chosen spacings of the side guides for engaging each of the canisters when inserted.

18. An arrangement as set forth in claim 17 above, wherein said support means have incremental vertical spacings which allow for cooling air flow between adjacent inserted canisters, and wherein the enclosure means includes backplane means adjacent the inserted ends of the canisters for mounting the connector means.

* * * * *